(12) United States Patent
Sadu et al.

(10) Patent No.: US 11,729,078 B2
(45) Date of Patent: Aug. 15, 2023

(54) METHOD AND DEVICES FOR A LOAD ALLOCATION AND MONITORING FOR A SUPPLY SECURITY-CRITICAL RESOURCE TO BE ALLOCATED IN A NETWORK

(71) Applicant: RHEINISCH-WESTFÄLISCHE TECHNISCHE HOCHSCHULE (RWTH) AACHEN, Aachen (DE)

(72) Inventors: Abhinav Sadu, Aachen (DE); Gianluca Lipari, Aachen (DE); Ferdinanda Ponci, Aachen (DE); Jindal Akshay, Aachen (DE)

(73) Assignee: RHEINISCH-WESTFÄLISCHE TECHNISCHE HOCHSCHULE (RWTH) AACHEN, Aachen (DE)

( * ) Notice: Subject to any disclaimer, the term of this patent is extended or adjusted under 35 U.S.C. 154(b) by 0 days.

(21) Appl. No.: 17/440,892

(22) PCT Filed: Mar. 20, 2020

(86) PCT No.: PCT/EP2020/057777
§ 371 (c)(1),
(2) Date: Sep. 20, 2021

(87) PCT Pub. No.: WO2020/188082
PCT Pub. Date: Sep. 24, 2020

(65) Prior Publication Data
US 2022/0166696 A1    May 26, 2022

(30) Foreign Application Priority Data

Mar. 21, 2019 (DE) .......................... 102019203874.3
Mar. 21, 2019 (LU) .................................. LU101163

(51) Int. Cl.
H04L 43/0817 (2022.01)
H04L 9/40 (2022.01)
H04L 67/12 (2022.01)

(52) U.S. Cl.
CPC ...... *H04L 43/0817* (2013.01); *H04L 63/1416* (2013.01); *H04L 67/12* (2013.01)

(58) Field of Classification Search
CPC .. H04L 43/0817; H04L 67/12; H04L 63/1416
See application file for complete search history.

(56) References Cited

U.S. PATENT DOCUMENTS

| 9,655,155 | B2 * | 5/2017 | Cho ....................... H04W 76/14 |
| 2004/0133690 | A1 * | 7/2004 | Chauffour ........... H04L 67/1031 709/225 |

(Continued)

FOREIGN PATENT DOCUMENTS

| CN | 109033143 | 12/2018 |
| EP | 3422267 | 1/2019 |

OTHER PUBLICATIONS

Fan M, Zhang X. Consortium blockchain based data aggregation and regulation mechanism for smart grid. IEEE Access. Mar. 15, 2019;7:35929-40. (Year: 2019).*

(Continued)

*Primary Examiner* — Syed A Zaidi
(74) *Attorney, Agent, or Firm* — Sheridan Ross P.C.

(57) ABSTRACT

Devices and method are disclosed for a load allocation and monitoring for a resource to be allocated in a network, where the resource to be allocated is a critical resource in terms of supply security for a population group and/or a system, and the critical resource comprises electric power, where the network is subdivided into network units, and each network unit has a network unit controller. In some examples, the method includes storing network unit control methods, network unit parameter data sets, and subnetwork monitor- (Continued)

IU  Subnetwork monitoring unit (111)
◨  Storage means (151)
▲  Blockchain (300)
☐  Allocation means (161)
⊡  Transmission means (162)
⊟  Monitoring means (152)
○  Network unit controller (211)
- - - Communication path between 111 and 211
········ Communication path between 111 for determining a location ing methods in at least one blockchain; allocating a subnetwork monitoring unit to one part of the network; and transmitting a network unit control method and a network unit parameter data set to each network unit controller of the part of the network, and the transmitting of the network unit control methods and the network unit parameter data sets is cryptographically secured against reading and tampering with the network unit control methods and the network unit parameter data sets in such a manner that the corresponding reading and tampering are precluded to the greatest extent possible and occurs in such a manner that the proper functioning of each network unit controller of the part of the network is ensured; and monitoring the proper function of each network unit controller of the part of the network by means of the subnetwork monitoring unit using a corresponding subnetwork monitoring method.

18 Claims, 6 Drawing Sheets

(56) References Cited

U.S. PATENT DOCUMENTS

| | | | | |
|---|---|---|---|---|
| 2005/0030952 | A1* | 2/2005 | Elmasry | H04L 47/245 370/395.2 |
| 2006/0034213 | A1* | 2/2006 | Munje | H04W 76/12 370/328 |
| 2009/0135758 | A1* | 5/2009 | Alper | H04L 45/02 370/328 |
| 2013/0064178 | A1* | 3/2013 | Cs | H04Q 9/00 370/328 |
| 2013/0074138 | A1* | 3/2013 | Chapman | H04N 21/64707 725/111 |
| 2017/0103468 | A1* | 4/2017 | Orsini | G06Q 40/12 |
| 2019/0036778 | A1 | 1/2019 | Bathen et al. | |
| 2019/0393722 | A1* | 12/2019 | Stöcker | H02J 13/00034 |
| 2020/0053048 | A1* | 2/2020 | Frenkel | H04L 63/1416 |
| 2020/0120001 | A1* | 4/2020 | Bathen | G06F 16/134 |
| 2020/0153250 | A1* | 5/2020 | Price | G06Q 50/06 |
| 2020/0412731 | A1* | 12/2020 | Gulbrandsen | G06F 16/2365 |

OTHER PUBLICATIONS

NPL Search Terms (Year: 2022).*
NPL Search Terms (Year: 2023).*
Official Action for German Patent Application No. 102019203874.3, dated Feb. 7, 2020, 4 pages.
International Search Report and Written Opinion for International (PCT) Patent Application No. PCT/EP2020/057777, dated Apr. 9, 2020, 10 pages.
English Translation of the International Search Report for International (PCT) Patent Application No. PCT/EP2020/05777, dated Apr. 9, 2020, 2 pages.

* cited by examiner

| IU | Subnetwork monitoring unit (111) |
|---|---|
| 🗄 | Storage means (151) |
| △ | Blockchain (300) |
| □ | Allocation means (161) |
| ⬚ | Transmission means (162) |
| ⌐ı | Monitoring means (152) |
| ○ | Network unit controller (211) |
| – – – | Communication path between 111 and 211 |
| ⋯⋯⋯ | Communication path between 111 for determining a location |

METHOD AND DEVICES FOR A LOAD ALLOCATION AND MONITORING FOR A SUPPLY SECURITY-CRITICAL RESOURCE TO BE ALLOCATED IN A NETWORK

CROSS REFERENCE TO RELATED APPLICATIONS

This application is a national stage application under 35 U.S.C. 371 and claims the benefit of PCT Application No. PCT/EP2020/057777 having an international filing date of 20 Mar. 2020, which designated the United States, which PCT application claimed the benefit of Luxembourg Patent Application No. LU101163 filed 21 Mar. 2019, and German Patent Application No. 10 2019 203 874.3 filed 21 Mar. 2019, the disclosures of each of which are incorporated herein by reference in their entireties.

The invention relates to a method and devices for a load allocation and monitoring for a supply security-critical resource to be allocated in a network.

When designing automation systems for supply networks, it is important to take resiliency into account. If a system is resilient, then it has increased reliability and availability. In the event of an attack or crash, the system would either mitigate the attack or provide a reduced downtime of the supply service.

US 2017 0 103 468 A1 discloses a system for a cryptographically secure, autonomous control of devices, having devices connected to it or remote-control devices in an electrically operated network and the transaction of the benefits, costs or value which are created or processed by the devices in this electrically operated network.

In a conventional network distribution system, there is generally a central control station, which comprises units such as supervisory control and data acquisition (SCADA), a distribution management system (DMS) and an energy management system (EMS). Real-time data is collected by remote devices, i.e. remote terminal units (RTUs), and stored in SCADA. The data is then processed by monitoring and control applications, such as status assessments, Volt VAR control or bottleneck management, which are hosted on DMS or EMS. These functionalities allow for reliable and efficient network operations so that the system can withstand malfunctions or inconveniences. However, because of the centralized nature, an attack would lead to a system failure and thus to a loss in operational security. The cyberattack on the Ukrainian power grid in 2015 shows that a robust network architecture is urgently needed.

Therefore, it would be desirable to provide a technical solution which eliminates or at least decreases one of the disadvantages from prior art regarding protection against failure and/or tampering.

An objective of this invention is to increase the resilience of network automation by distributed, secure and automated migration of network applications or control functions.

An objective of the invention is to propose a way that avoids or at least decreases at least some of the disadvantages known from prior art.

The present invention solves at least one of these disadvantages by means of a method according to the main claim and devices according to the parallel claims. Preferred developments are the subject matter of dependent claims.

According to the main claim, the solution according to the invention proposes a method for a load allocation and monitoring a resource to be allocated in a network. The resource to be allocated here is a critical resource in terms of supply security of a population group and/or a system. This critical resource preferably comprises electrical energy. The network is subdivided into network units and each network unit has a network unit controller. The method comprises: storing network unit control methods, network unit parameter data sets and subnetwork monitoring methods in at least one blockchain, wherein the at least one blockchain is set up to store static and/or dynamic data in a particularly efficient manner; allocating a subnetwork monitoring unit to a part of the network; transmitting a network unit control method to each network unit controller of the part of the network; [and] transmitting a network unit parameter data set to each network controller of the part of the network. The transmission of the network unit control method and the network unit parameter data sets is cryptographically protected against reading and tampering with the network unit control methods and the network unit parameter data sets in such a manner that the corresponding reading and tampering are prevented to the greatest extent possible. And the network unit control methods and the network unit parameter data are transmitted to the corresponding network unit controllers in such a manner that these network unit control methods and the network unit parameter data sets ensure proper functioning of each network unit controller of the part of the network.

Furthermore, the method comprises monitoring of the proper functioning of each network unit controller of the part of the network by the subnetwork monitoring unit using a corresponding subnetwork monitoring method.

Load allocation according to the present invention refers to allocating a portion of the resources to be allocated to the network, a subnetwork or to a network unit.

A critical resource according to the present invention refers to a resource which is important, necessary or essential in terms of supply security for a population group and/or a system to ensure supply security and/or system operation.

Examples of such critical resources can thus be electrical energy, water and/or data communication, such as IP communication and/or data communication with respect to automation technology, particularly in connection with the so-called Industry 4.0.

A network unit according to the present invention thereby to a device to which loads are connected and which are allocated the necessary resources by this network unit.

A network unit controller according to the present invention refers to a controller for a network unit that takes over or controls the allocation of the required resource to the loads connected to the network unit.

A network unit control method according to the present invention refers to a method which provides or comprises an allocation routine for allocating a required resource to the consumers or loads connected to the corresponding network unit.

A network unit parameter data set according to the present invention refers to data that is needed for the functioning or control of the corresponding network unit controller or corresponding network unit. Generally, these are for example setting parameters and/or functional parameters for the network unit controller or the corresponding network unit.

A part of a network according to the present invention means that the network can be subdivided into segments. Each segment here corresponds to another part of the network. This division is generally of a purely logical nature, and thus generally a virtual division. Preferably, the network consists of at least two or three segments. However, in principle any number of segments are possible. In a very small network, there may also be only one single segment so that the part of the network comprises the entire network. Preferably, each part of the network contains at least two network units. However, if the network is subdivided into many segments or unevenly distributed segmentation is selected, then a part of the network, in other words one segment, can also consist of only one network unit. Segmentation can also be selected, for example, based on load-types, load locations, network unit-types, network unit locations and many other similar criteria. Segmentation can also occur based on a random decision. Segmentation of the network can thus be perceived as dynamic or quasi-static over the entire runtime, depending on the period of time for which segmentation is considered. However, segmentation can also remain unchanged over a longer period of time and thus be regarded as static.

A subnetwork monitoring method according to the present invention refers to a method that takes over or is responsible for the superordinate monitoring of a part of the network. The subnetwork monitoring method may also be assigned a control function of the corresponding subnetwork or its network unit controllers or its network units.

A blockchain according to the present invention refers to a continually expandable list of data sets, also referred to as "blocks," which are linked together by means of cryptographic methods. Each block here typically contains one cryptographically secure hash value (variance coefficient) of the preceding block, a time stamp and transaction data. This concept is also referred to as distributed ledger technology.

Static data according to the present invention refers to data that is generally not changed or rarely changed over an operating period.

By contrast, dynamic data according to the present invention refers to data which is subject to continuous or frequent changes during ongoing operations.

Particularly efficient storage according to the present invention means that the data to be stored is stored in a required manner in a particularly easy, quick, compact or otherwise favorable manner, in regard to the sequence of the method.

Reading according to the present invention means that required information or data is obtained during its transmission from the data stream and/or in a state in which it is stored in a memory prior to or after transmission.

Tampering according to the present invention means that required information or data is modified during its transmission in the data stream and/or in a state in which it is stored in a memory prior to or after transmission.

Precluding reading and tampering to the greatest extent possible according to the present invention means to the extent that this is not possible with justifiable effort and justifiable time at least by the submission date based on the prevailing opinion. However, preferably, this applies at the point in time in which the method is carried out. "At the point in time" preferably means a period of time that is in temporally relevant proximity prior to the point in time in which the method is carried out.

Ensuring proper functioning according to the present invention means that it is ensured that the function can be executed securely and correctly.

The method according to the invention has the advantage that both network automation and network resilience can be increased.

The subject matter of a first parallel claim of the invention comprises a network unit control device for controlling a network unit within a network, wherein the network is preferably a network for a resource to be allocated, and wherein the resource to be allocated is a critical resource in terms of supply security of a population group and/or a system. The critical resource here preferably comprises electrical energy. The network unit control device comprises: transmission and/or reception means, wherein the transmission and/or reception means are equipped to transmit a network unit control method and/or a network unit parameter data set of the network unit control device from and/or to a network monitoring unit or a subnetwork monitoring unit. Transmission of the network control method and/or the network unit parameter data set occurs in a manner that is cryptographically secured against the reading and tampering with the network unit control method and/or the network unit parameter data set in such a manner that the corresponding reading and tampering with the transmission is precluded to the greatest extent possible. The network unit control device is set up, based on the network unit control method and/or the network unit parameter data set, to ensure proper operation of the corresponding network unit. And the network unit control device is set up to at least partially execute a method according to the invention.

The network unit control device according to the invention has the advantage that both network automation and network resilience can be increased.

The subject matter of another parallel claim of the invention comprises a monitoring device for monitoring network unit control devices of corresponding network units within a network, wherein the network is preferably a network for a resource to be allocated, and wherein the resource to be allocated is a critical resource in terms of supply security of a population group and/or a system. The critical resource here preferably comprises electrical energy. The monitoring device comprises: storage means for storing network unit control methods, network unit parameter data sets and subnetwork monitoring methods in at least one block chain, wherein the at least one block chain is set up to store static and/or dynamic data in a particularly efficient manner; transmission and/or reception means, wherein the transmission and/or reception means are set up to transmit network unit control methods and/or network unit parameter data sets of the network unit control devices from and/or to the network control devices. The transmission of the network unit control methods and/or the network control devices is cryptographically secured against reading and tampering with the network unit control method and/or the network unit parameter data sets in such a manner that the corresponding reading and tampering with the transmission is excluded to the greatest extent possible. And the monitoring device also comprises: a monitoring means for monitoring proper operation of the corresponding network units or proper functioning of the corresponding network unit control devices, based on the network unit control method and/or the network unit parameter data sets. And the monitoring device is set up to at least partially execute a method according to the invention.

The monitoring device according to the invention has the advantage that both network automation and network resilience can be increased.

The subject matter of another parallel claim of the invention has a load allocation and monitoring system for a resource to be allocated in a network, preferably for a critical resource in terms of supply security of a population group and/or a system, wherein the critical resource preferably comprises electrical energy, and wherein the network is subdivided into network units and each network unit has a network unit controller. The load allocation and monitoring system comprises: storage means for storing network unit control methods, network unit parameter data sets and subnetwork monitoring methods in at least one blockchain, wherein the at least one blockchain is set up to store static and/or dynamic data in a particularly efficient manner; allocation means for allocating a subnetwork monitoring unit to a part of the network; a transmission means for transmitting a network unit control method to each network unit controller of the part of the network. The transmission of the network unit control method and the network unit parameter data sets is cryptographically secured against reading and tampering with the network unit control method and the network unit parameter data sets in such a manner that the corresponding reading and tampering are precluded to the greatest extent possible. The network unit control method and the network unit parameter data sets are transmitted to the corresponding network unit controllers in such a manner that by means of these network unit control methods and the network unit parameter data sets, proper functioning of each network unit controller of the part of the network is ensured. And the load allocation and monitoring system also comprises: a monitoring means for monitoring the proper functioning of each network controller of the part of the network by the subnetwork monitoring unit using a corresponding subnetwork monitoring method. And the system is set up to execute a method according to the invention.

By means of the network unit controller and by using network unit control methods, the network unit parameter data sets and the subnetwork monitoring methods, corresponding loads are allocated to the individual network units.

The load allocation and monitoring system according to the invention has the advantage that both network automation as well as network resilience can be increased.

The subject matter of another parallel claim relates to a computer program product for a device according to the invention, wherein the device can be operated pursuant to a method according to the invention.

By means of the teaching according to the invention, one achieves the advantage that the method can be executed in a particularly efficient automated manner.

The subject matter of another parallel claim relates to a data carrier having a computer program product according to the invention.

By means of the teaching according to the invention, one achieves the advantage that the method can be distributed to or stored on the devices and/or systems executing the method in a particularly efficient manner.

Before the designs of the invention are described in more detail below, it should first be noted that the invention is not restricted to the described components or the described method steps. Furthermore, the terminology used does not represent any limitation but is only of an illustrative nature. To the extent that the singular is used in the description and the claims, the plural is also included in each instance, unless the context explicitly precludes this. Any method steps may, unless explicitly precluded by the context, be executed in an automated manner. Corresponding method steps may result in corresponding device properties and vice versa so that, unless explicitly precluded by the context, a change of a method feature into a device feature is made possible and vice versa.

Additional illustrative designs of the method according to the invention shall be explained below.

According to a first preferred design, the method also comprises: allocating an additional subnetwork monitoring unit to an additional part of the network; transmitting a network unit control method to each network unit controller of the other part of the network; transmitting a network unit parameter data set to each network unit controller of the other part of the network; and monitoring the proper functioning of each network unit controller of the other part of the network by the other subnetwork monitoring unit using a corresponding subnetwork monitoring method.

This design has the advantage of further increasing both network automation and network resilience.

According to another preferred design, the method also comprises: loading network information, wherein the network information is indicative for the proper functioning of each network unit controller to be monitored of the network.

This design has the advantage that the functional security of the network can be increased.

According to another preferred design, the method also comprises that the loading of network information comprises: loading of network information for every part of the network; and stored retention of the loaded network information for each part of the network in the corresponding subnetwork monitoring unit.

This design has the advantage that the network automation of the network can be increased even further.

According to another preferred design, the method has the loading and/or stored retention of the network information occurring in a manner that is cryptographically secured against reading and tampering with the network information such that the corresponding reading and tampering are precluded to the greatest extent possible.

This design has the advantage that the security of the network can be increased.

According to another preferred design, the method comprises the transmitting of a network unit control method to each network unit controller of each part of the network, the transmitting of a network unit parameter data set to each network unit controller of each part of the network and/or the loading of network information for each part of the network and the stored retention of the loaded network information for each part of the network in the corresponding subnetwork monitoring unit occur based on a smart contracting method.

According to the present invention, smart contracting refers to computer protocols and/or virtual software-based protocols that map or review contracts or technically support the negotiation or fulfillment of a contract. Recording the contract in writing on paper may thus become unnecessary, with smart contracts mapping the logic of contractual provisions in a technical manner.

Within the meaning of the invention, smart contracts are self-executing codes, which automate task sequences or processes. They are located on blockchain nodes and are therefore secured in a decentralized and cryptographic manner. Therefore, changes or amendments of a smart contract code are not easily possible. Such a smart contract is triggered by a transaction. It is then executed in an automatic and specified manner on each node in the network, based on the data entered in the transmitted transaction and the global status of the smart contract, i.e., the data stored on the blockchain node. Smart contracts allow a third party to simplify the exchange of information and/or instructions between the transaction partners or devices, since all network nodes execute the contract and achieve a consensus about the generated output. If a node is malicious or altered, it leads to different results and prevents the network from reaching a consensus. Due to its non-deterministic nature, the transaction is thus rejected. In addition, all transactions are digitally signed and stored in a non-modifiable ledger, which maintains data integrity and allows tracing the history or the ability to check data. On the basis of all these properties, such a blockchain-based smart contract according to the invention provides an opportunity to improve the resilience of network automation.

This design has the advantage that both network automation and network resilience can be increased even further.

According to another preferred design, the method also has an additional blockchain, with the blockchain set up to store static data in a particularly efficient manner and the additional blockchain set up to store dynamic data in a particularly efficient manner.

This design has the advantage that the security of the network can be increased even further.

According to another preferred design, the method also comprises that a particularly efficient storage of data in the corresponding blockchain comprises particularly storage-efficient and/or particularly time-efficient processing of the corresponding data.

This design has the advantage that the performance speed of the network can be increased, and/or that the costs can be lowered, since lower demands can be placed on the hardware.

According to another preferred design, the method also comprises that the blockchain and/or the additional blockchain is further set up to store at least one of the following data sets:

Requirement parameters for every network unit control method regarding a verification whether a subnetwork monitoring unit is suited to execute the corresponding network unit control method.

Network unit control parameters of each subnetwork monitoring unit with respect to the accessibility or responsiveness of the corresponding subnetwork monitoring unit.

The requirement parameters for each network unit control method regarding a verification whether a subnetwork monitoring unit is suited to execute the corresponding network unit control method may differ for each network unit controller found in the network or for every network unit control method to be executed in the network. In particular, the connection between a sensor and an actuator may also be subject to various quality of service (QoS) requirements, thereby meeting the requirement parameters of these different quality of service requirements for the relationship of sensor to actuator for each corresponding network unit controller.

This design has the advantage that the requirement parameters regarding a verification whether a subnetwork monitoring unit is suited to execute the corresponding network unit control method and/or the network unit control parameters regarding the accessibility or responsiveness of the corresponding network unit controller can be secured against tampering in the same way as the other data to be secured in the corresponding blockchain.

According to another preferred design, the method also comprises: randomized, periodic and/or triggered allocation of each network unit control method to each network unit controller; and randomized, periodic and/or triggered allocation of each network unit parameter data set to each network unit controller.

Randomized allocation according to the present invention refers to an allocation based on a triggered random event. This can mean in particular an allocation according to a conventional randomness principle.

Periodic allocation according to the present invention refers to an allocation according to a temporal and/or numerical sequence. In particular, it may mean that after each specified time period has elapsed, a new allocation takes place. This new allocation can then occur in a randomized manner, for example. In this case, the segmentation can be regarded as dynamic.

Using this method, the system can avoid failures since the performance environment of the actor is not specified and it would be difficult for any attacker to predict the actor's location of performance. Generally, these actors can be automated processes (algorithms) for network monitoring and for controlling the network or network units. Assuming that a recurring migration is triggered before the runtime fails, the actor is migrated into a new runtime and the attack is executed. Such a runtime can be hardware—in other words, a device—which this actor hosts, in other words accommodates and provides. In addition, the attacker cannot immediately predict the new location of the actor since the target runtime is selected randomly by the smart contract. Therefore, periodic migration can make the system more robust and more reliable. However, only one actor can be migrated if multiple actors are present over the runtime. Furthermore, for the implementation, it may be appropriate or required to provide actors for network monitoring, control, security functions/algorithms and/or runtime.

The steps for executing the migration can be illustratively described as follows:

1. Every runtime is operating and automatically triggers the migration at fixed time intervals.

2. Runtime delivers a blockchain transaction that executes a smart contract logic.

3. Smart contract generates an output that contains the target runtime ID, the ID of the migration actor and the status of the actor.

4. The current runtime executes the actual migration using the output of the smart contract.

5. If the migration was successful, the current runtime or the method submits an additional transaction for updating the blockchain status, i.e., for updating the asset, in other words the subnetwork monitoring unit, the network unit controller and/or the network unit, the migrated actor, in other words the subnetwork monitoring unit.

A triggered allocation according to the present invention means an allocation that is triggered by the occurrence of a certain event. This allocation can then occur in a randomized manner, for example. In this case, segmentation can be regarded as quasi-static.

For example, in the event of a runtime error, all actors, in other words network unit controllers that run on this runtime, must be deployed again or migrated to a new performance environment, in other words a different subnetwork monitoring unit, to minimize service downtimes. The status of each actor is securely stored at regular intervals in the blockchain and the last stored status can be used for error handling. The status of an actor may contain connection information, such as inports and outports, which may be useful for re-deployment. This method resembles a checkpoint/restart method. For example, a method for redeploying actors of a failed runtime may look as follows:

1. A heartbeat actor, which runs on every runtime, in other words the subnetwork monitoring unit, regularly checks whether other runtimes are functioning or not. When a runtime, in other words a subnetwork monitoring unit, fails, all other runtimes in the same network will discover the fault since they are not receiving a heartbeat signal from the failed runtime.

2. All other runtimes in the same network stop their periodic migration.

3. A new operative runtime must be selected that is responsible for the redistribution of the actors, in other words network unit control methods, network unit parameter data sets, and/or network unit controller, of the failed runtime.

4. The selected runtime sends a blockchain transaction that contains the ID of the faulty runtime.

5. A smart contract processes the transaction and selects the new optimal runtime for the placement of an actor of the failed runtime. Results are generated that include the target runtime ID, the actor ID (the actor to be redeployed) and the status of the actor (the last stored status prior to the fault).

6. The selected node analyzes the status of the actor, reconfigures the actuator ports and then initiates the deployment of the actor on the selected target runtime.

7. If the deployment is successful, the selected node sends an additional blockchain transaction to update the ownership of the newly deployed actor.

8. The selected node repeats steps 3 to 5 until all actors of the failed runtime are redeployed.

9. Upon completion of the redeployment, the selected runtime sends a blockchain transaction to update the status of the failed runtime so that the logic of the smart contract does not take into account this runtime in its runtime selection process.

10. The selected runtime notifies other runtimes to restart their periodic migration.

This design has the advantage that both network automation and network resilience can be further increased.

According to another preferred design, the method also comprises that the randomized, periodic and/or triggered allocation of each network unit control method to each network unit controller takes into consideration a capability to execute the network unit control method to be allocated, for the corresponding network unit controller, in the network unit controller to be allocated.

A capability to execute the network unit control method to be allocated according to the present invention means that the complexity of the network unit control method to be allocated may not exceed the complexity or capabilities of the network unit controller or that it must be adapted to the complexity of said network unit controller, and [that it is] thus not harmful to the proper control of the network unit in question by the network unit controller to be operated using the network unit control method to be allocated.

This design has the advantage that both the network automation and the proper functioning of the individual network units can be increased even further.

According to another preferred design, the method also has the randomized, periodic and/or triggered allocation of each network unit control method to each network unit controller, and the randomized, periodic and/or triggered allocation of each network unit parameter data set to each network unit controller occurring in each case within the respective part of the network of that subnetwork monitoring unit that is responsible for the respective part of the network.

This design has the advantage that both the network automation and the network resilience can be increased even further.

According to another preferred design, the method also comprises that the allocation of each network unit control method to each subnetwork monitoring unit comprises a verification of the corresponding network unit controller as to whether the latter is suited to execute the network unit control method to be allocated. And if the corresponding subnetwork monitoring unit is suited to execute the network unit control method to be allocated, this network unit control method is allocated to the corresponding subnetwork monitoring unit.

This design has the advantage that the subnetwork monitoring unit only receives allocations of network unit control methods that it can also execute. Thus, allocations are prevented that can result in non-execution of network unit control methods.

According to another preferred design, the method also comprises that the storing of network unit control methods, network unit parameter data sets and subnetwork monitoring methods occurs in at least one blockchain based on a time stamp method.

A time stamp method according to the present invention means a method that can allocate a unique point in time to an event.

This design has the advantage that the security of the network can be increased even further.

According to another preferred design, the method also comprises that the resource to be allocated is an electrical energy to be distributed, a liquid to be distributed, or a gas to be distributed.

This design has the advantage that the method can be applied to supply resources most critical for human habitation.

According to another preferred design, the method also comprises: a distributed allocation of each network unit controller of the network to each part of the network of each subnetwork monitoring unit.

This design has the advantage that both network automation and network resilience can be increased even further.

According to another preferred design, the method also comprises that the transmission of a network unit control method to each network unit controller of each part of the network and/or the transmission of a network unit parameter data set to each network unit controller of each network and/or the loading of network information for each part of the network and/or the stored retention of the loaded-in network information for each part of the network in the corresponding subnetwork monitoring unit occurs in real time.

Real time according to the present invention characterizes the operation of information technology systems that can deliver certain results reliably within a predetermined time frame, for example in a fixed time frame. The hardware and software must ensure that no delays occur that could prevent compliance with this requirement. Data processing does not have to occur particularly quickly; it must only occur in an assuredly rapid enough manner for the respective application. The current relevant standard for this is DIN ISO/IEC 2382 (version of May 2015).

This design has the advantage that the functional security of the network can be increased even further.

According to another preferred design, in the event of a failure of any subnetwork monitoring unit the method also comprises: a distributed allocation of those network unit controllers which are part of the network of the failed subnetwork monitoring unit to the remaining subnetwork monitoring units not affected by the outage.

This design has the advantage that both network automation and network resilience can be increased even further.

The invention will be explained below in greater detail using the drawings.

The invention will be described below in more detail with reference to the drawings. It should be noted here that various aspects are described each of which may be used individually or in combination. This means that any aspect may be utilized with various embodiments of the invention unless explicitly represented as a mere alternative.

Furthermore, for the sake of simplicity and as a rule, reference will always be made to only one entity. However, unless explicitly noted, the invention may also have several of any of the entities in question. To that extent, the use of the words "a" and "an" are to be understood only as an indication that at least one entity is being used in a single design.

To the extent that methods are described hereinafter, the individual steps of a method can be arranged and/or combined in any sequence as long as the context does not explicitly provide otherwise. Furthermore, the methods can be combined with one another unless expressly indicated otherwise.

As a rule, specifications having numerical values are not to be understood as exact values, but as having a tolerance of +/−1% to +/−10%.

If standards, specifications or the like are mentioned in this application, at least the standards, specifications or similar that were applicable on the application date should always be assumed. In other words, if a standard/specification or the like is updated or replaced by a subsequent one, the invention shall also be applicable to these.

The drawings depict various embodiments.

Figure 1:
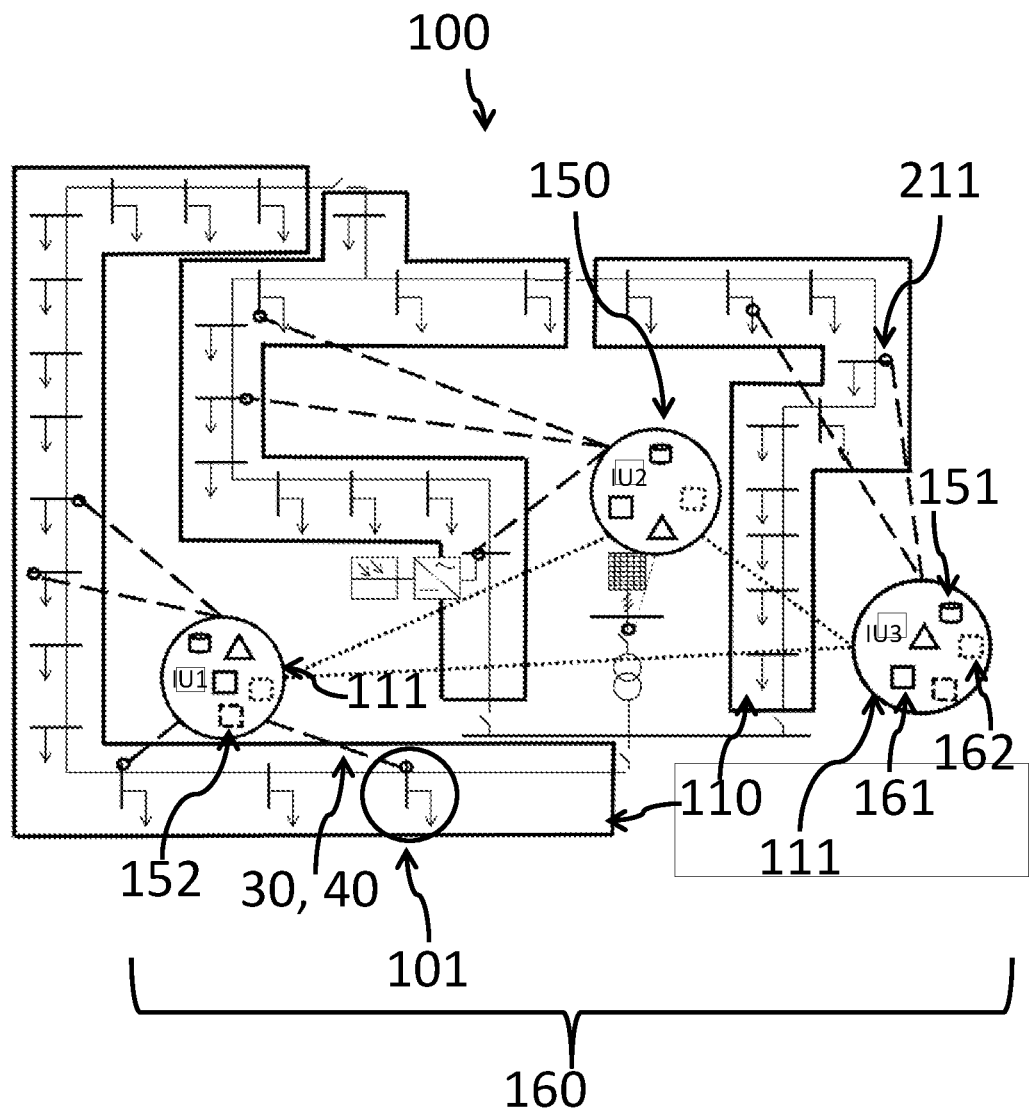
FIG. 1 shows a schematic diagram of a proposed network which is operated using a method according to an illustrative design of the invention.

FIG. 1 depicts a schematic diagram of a proposed network which is operated using a method according to an illustrative design of the invention.

This FIG. 1 shows a schematic diagram of a load allocation and monitoring system 160 according to the invention for a resource to be allocated in a network 100, preferably for a critical resource in terms of supply security of a population group and/or a system, wherein the critical resource preferably comprises electrical energy, and wherein the network 100 is subdivided into network units 101 and each network unit 101 has a network unit controller 211. Each network unit 101 can also have a plurality of network unit controllers 211. The load allocation and monitoring system 160 has monitoring devices 150 according to the invention for the monitoring 50 of network unit control devices 211 of corresponding network units 101 within a network 100. The load allocation and monitoring system 160 also has network unit control devices 211 according to the invention for controlling a network unit 101 within a network 100. Furthermore, a method according to the invention ensures load allocation and monitoring for the to-be-allocated resource in the network 100.

Thus, the load allocation and monitoring system 160 comprises: storage means 151 for storing 10 (not depicted in FIG. 1) network unit control methods 11 (not depicted in FIG. 1), network unit parameter data sets 12 (not depicted in FIG. 1) and subnetwork monitoring methods 13 (not depicted in FIG. 1) in at least one blockchain 300 (not depicted in FIG. 1), the at least one blockchain 300 being set up to store static and/or dynamic data in a particularly efficient manner; allocation means 161 for allocating 20 (not depicted in FIG. 1) a subnetwork monitoring unit 111 to a part of the network 110; a transmission means 162 for transmitting 30 a network unit control method 11 to each network unit controller 211 of the part of the network 110; and an additional transmission means 163 (not depicted in FIG. 1) for transmitting 40 a network unit parameter data set 12 to each network unit controller 211 of the part of the network 110. The transmitting 30, 40 of the network unit control methods 11 and the network unit parameter data sets 12 is cryptographically secured against reading and tampering with the network unit control methods 11 and the network unit parameter data sets 12 in such a manner that the corresponding reading and tampering are precluded to the greatest extent possible, and the transmitting 30, 40 of the network unit control methods 11 and the network unit parameter data sets 12 to the corresponding network unit controllers 211 occurs in such a manner that these network unit control methods 11 and these network unit parameter data sets 12 ensure proper functioning of each network unit controller 211 of the part of the network 110. And furthermore, the load allocation and monitoring system 160 has a monitoring means 152 for monitoring 50 the proper functioning of each network unit controller 211 of the part of the network 110 by the subnetwork monitoring unit 111 using a corresponding subnetwork monitoring method 13.

Figure 2:
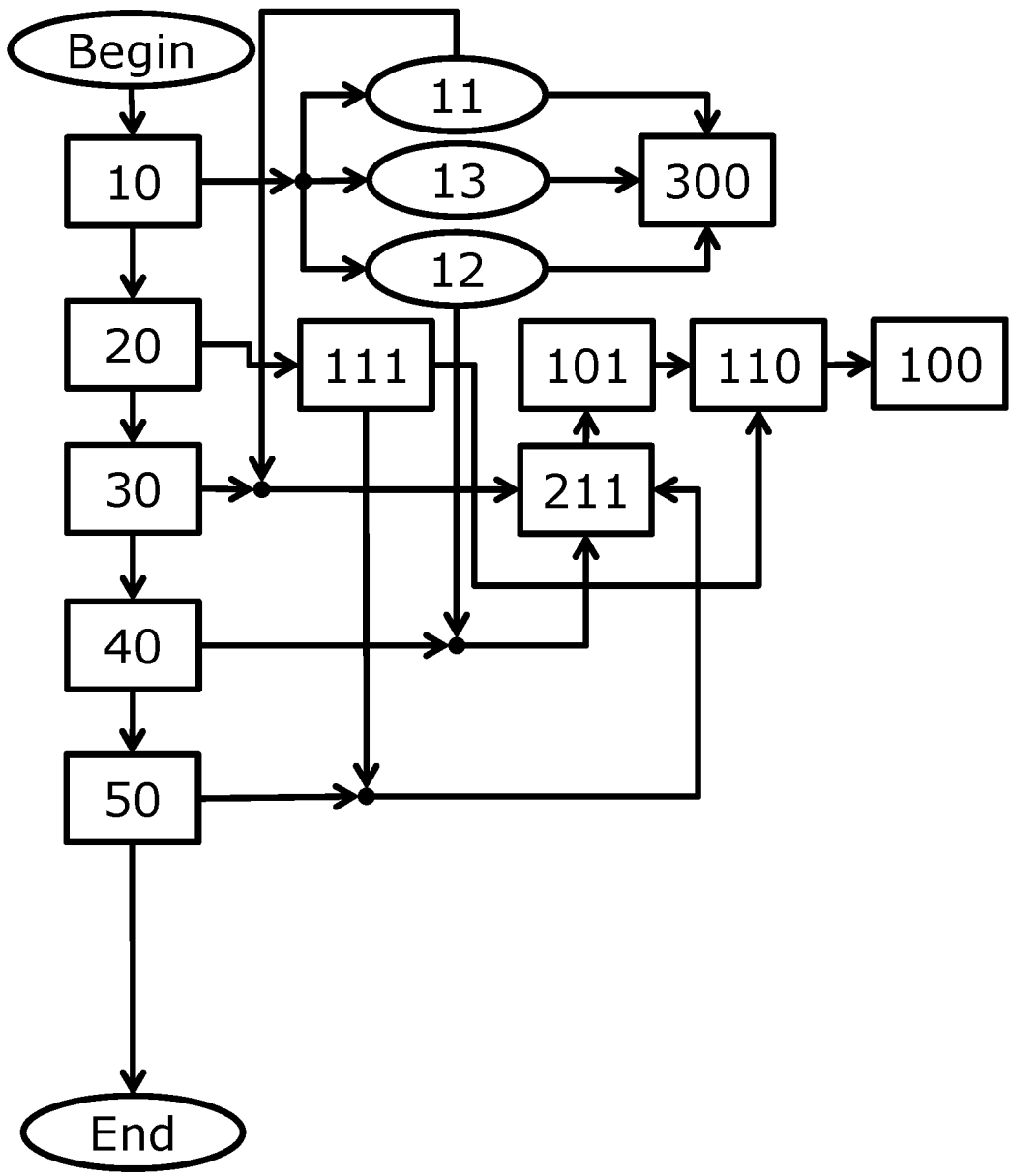
FIG. 2 shows a schematic diagram of a process of the method proposed in FIG. 1 according to another illustrative design of the invention.

FIG. 2 depicts a schematic diagram of a method sequence according to the invention for the load allocation and monitoring system 160 proposed in FIG. 1 according to another illustrative design of the invention.

This FIG. 2 shows a method for a load allocation and monitoring for a resource to be allocated in a network 100, wherein the resource to be allocated is a critical resource in terms of supply security of a population group and/or a system, wherein the critical resource preferably comprises electrical energy, and wherein the network 100 is subdivided into network units 101 and each network unit 101 has a network unit controller 211, the method comprising: storing 10 network unit control methods 11, network unit parameter data sets 12 and subnetwork monitoring methods 13 in at least one blockchain 300, wherein the at least one blockchain 300 is set up to store static and/or dynamic data in a particularly efficient manner; allocating 20 a subnetwork monitoring unit 111 to a part of the network 110; transmitting 30 a network unit control method 11 to each network unit controller 211 of the part of the network 110; and transmitting 40 a network unit parameter data set 12 to each network unit controller 211 of the part of the network 110. The transmitting 30, 40 of the network unit control methods 11 and the network unit parameter data sets 12 is cryptographically secured against reading and tampering with the network unit control methods 11 and the network unit parameter data sets 12 in such a manner that the corresponding reading and tampering are precluded to the greatest extent possible. And the transmitting 30, 40 of the network unit control methods 11 and the network unit parameter data sets 12 to the corresponding network unit controllers 211 occurs in such a manner that these network unit control methods 11 and these network unit parameter data sets 12 ensure proper functioning of each network unit controller 211 of the part of the network 110. And the method also comprises: monitoring 50 of the proper function of each network unit controller 211 of the part of the network 110 by the subnetwork monitoring unit 111 using a corresponding subnetwork monitoring method 13.

Figure 3:
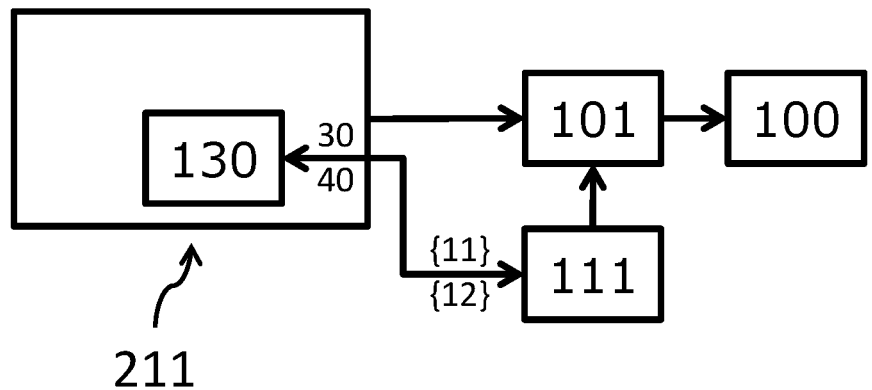
FIG. 3 shows a schematic diagram of a first proposed device according to another illustrative design of the invention.

FIG. 3 depicts a schematic diagram of a first proposed device according to another illustrative design of the invention.

This FIG. 3 shows a schematic diagram of a network unit control device 211 according to the invention for controlling a network unit 101 within a network 100, wherein the network 100 is preferably a network for a resource to be allocated, and wherein the resource to be allocated is a critical resource in terms of supply security of a population group and/or a system, and wherein the critical resource preferably comprises electrical energy, the network unit control device 211 comprising: a transmission and/or reception means 130, wherein the transmission and/or reception means 130 is set up for transmitting 30, 40 a network unit control method 11 and/or a network unit parameter data set 12 of the network unit control device 211 from and/or to a network monitoring unit or a subnetwork monitoring unit 111. The transmitting 30, 40 of the network unit control method 11 and/or the network unit parameter data set 12 is cryptographically secured against reading and tampering with the network unit control method 11 and/or the network unit parameter data sets 12 in such a manner that the corresponding reading and tampering with the transmission 30, 40 are precluded to the greatest extent possible. The network unit controller 211 is set up, based on the network unit control method 11 and/or the network unit parameter data set 12, to ensure proper operation of the corresponding network unit 101. And the network unit control device 211 is set up to at least partially execute a method according to the invention.

Figure 4:
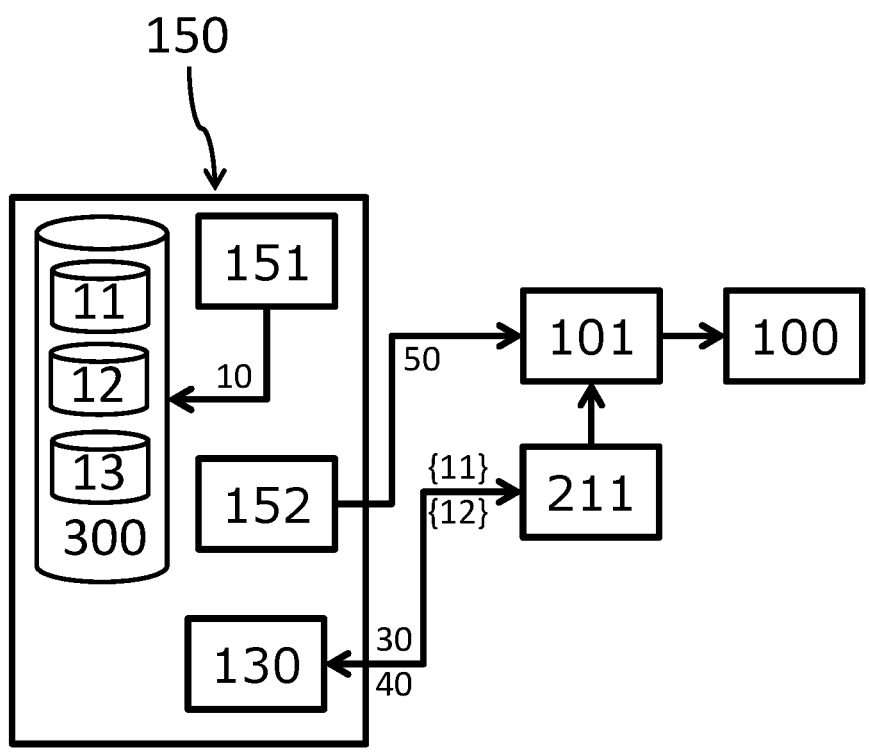
FIG. 4 shows a schematic diagram of another proposed device according to another illustrative design of the invention.

FIG. 4 depicts a schematic diagram of an additional proposed device according to another illustrative design of the invention.

This FIG. 4 shows a schematic diagram of a monitoring device 150 according to the invention for monitoring 50 network unit control devices 211 of corresponding network units 101 within a network 100, wherein the network 100 is preferably a network for a resource to be allocated, and wherein the resource to be allocated is a critical resource in terms of supply security of a population group and/or a system, and wherein the critical resource preferably comprises electrical energy, the monitoring device 150 comprising: storage means 151 for storing 10 network unit control methods 11, network unit parameter data sets 12 and subnetwork monitoring methods 13 in at least one blockchain 300, wherein the at least one blockchain 300 is set up to store static and/or dynamic data in a particularly efficient manner; and a transmission and/or reception means 130, wherein the transmission and/or reception means 130 is set up for transmitting 30, 40 network unit control methods 11 and/or network unit parameter data sets 12 of the network unit control devices 211 from and/or to the network unit control devices 211. The transmitting 30, 40 of the network unit control methods 11 and/or the network unit parameter data sets 12 is cryptographically secured against reading and tampering with the network unit control methods 11 and/or the network unit parameter data sets 12 in such a manner that the corresponding reading and tampering with the transmission 30, 40 are precluded to the greatest extent possible. The monitoring device 150 also has monitoring means 152 for monitoring 50 the proper operation of the network units 101 or proper function of the corresponding network unit control devices 211, based on the network unit control methods 11 and/or the network unit parameter data sets 12. And the monitoring device 150 is set up to at least partially execute a method according to the invention.

Figure 5:
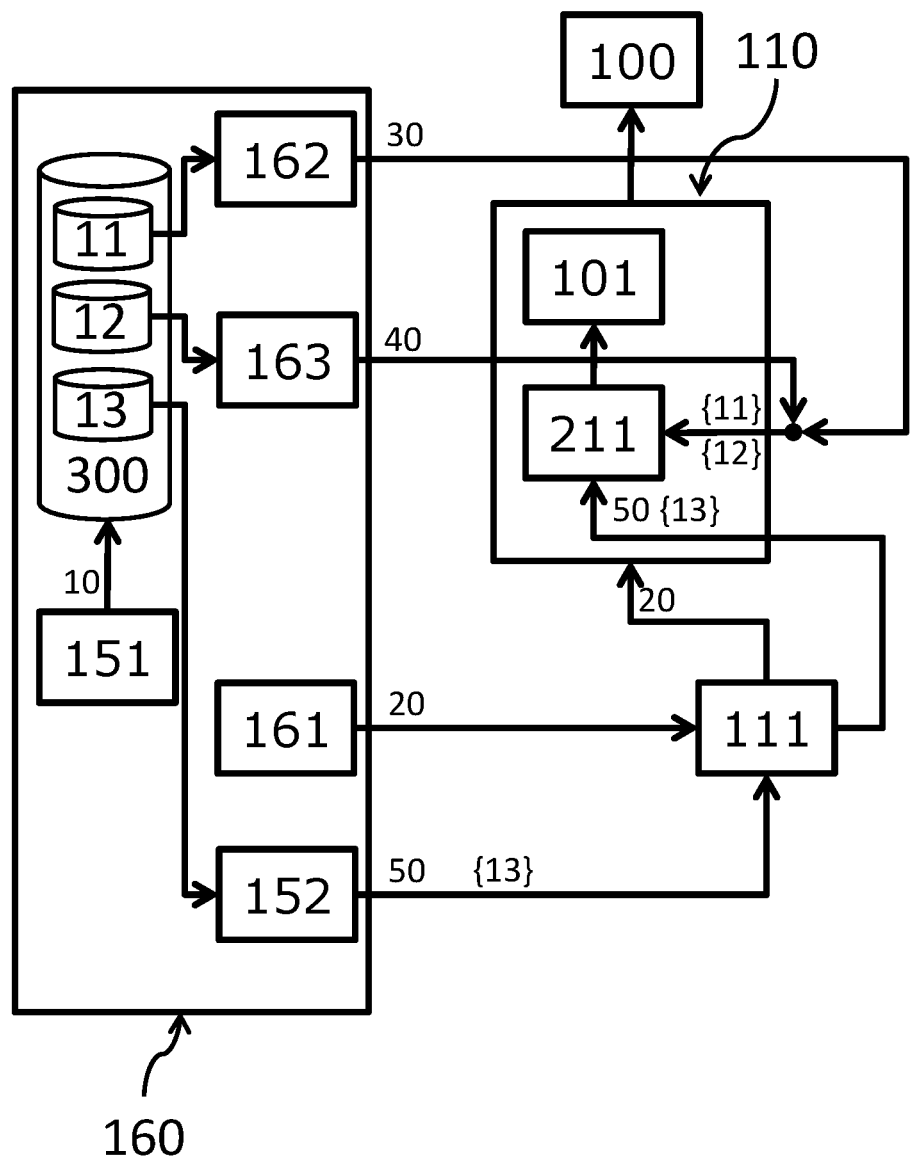
FIG. 5 shows a schematic diagram of another proposed device according to another illustrative design of the invention.

FIG. 5 depicts a schematic diagram of another proposed device according to another illustrative design of the invention.

This FIG. 5 shows a schematic diagram of a load allocation and monitoring system 160 according to the invention for a resource to be allocated in a network 100, preferably for a critical resource in terms of supply security of a population group and/or a system, wherein the critical resource preferably comprises electrical energy, and wherein the network 100 is subdivided into network units 101 and each network unit 101 has a network unit controller 211, the load allocation and monitoring system 160 having: storage means 151 for storing 10 network unit control methods 11, network unit parameter data sets 12 and subnetwork monitoring methods 13 in at least one blockchain 300 [and] the at least one blockchain 300 is thereby set up to store static and/or dynamic data in a particularly efficient manner; allocation means 161 for allocating 20 a subnetwork monitoring unit 111 to a part of the network 110; a transmission means 162 for transmitting 30 a network unit control method 11 to each network unit controller 211 of the part of the network 110; and an additional transmission means 163 for transmitting 40 a network unit parameter data set 12 to each network unit controller 211 of the part of the network 110. Transmitting 30, 40 of the network unit control methods 11 and the network unit parameter data sets 12 is cryptographically secured against reading and tampering with the network unit control methods 11 and the network unit parameter data sets 12 in such a manner that the corresponding reading and tampering are precluded to the greatest extent possible. And transmitting 30, 40 the network unit control methods 11 and the network unit parameter data sets 12 to the corresponding network unit controllers 211 occurs in such a manner that these network unit control methods 11 and these network unit parameter data sets 12 ensure proper functioning of each network unit controller 211 of the part of the network 110. Furthermore, the load allocation and monitoring system 160 has monitoring means 152 for monitoring 50 the proper function of each network unit controller 211 of the part of the network 110 by the subnetwork monitoring unit 111 using a corresponding subnetwork monitoring method 13. And the system is set up to execute a method according to the invention.

Figure 6:
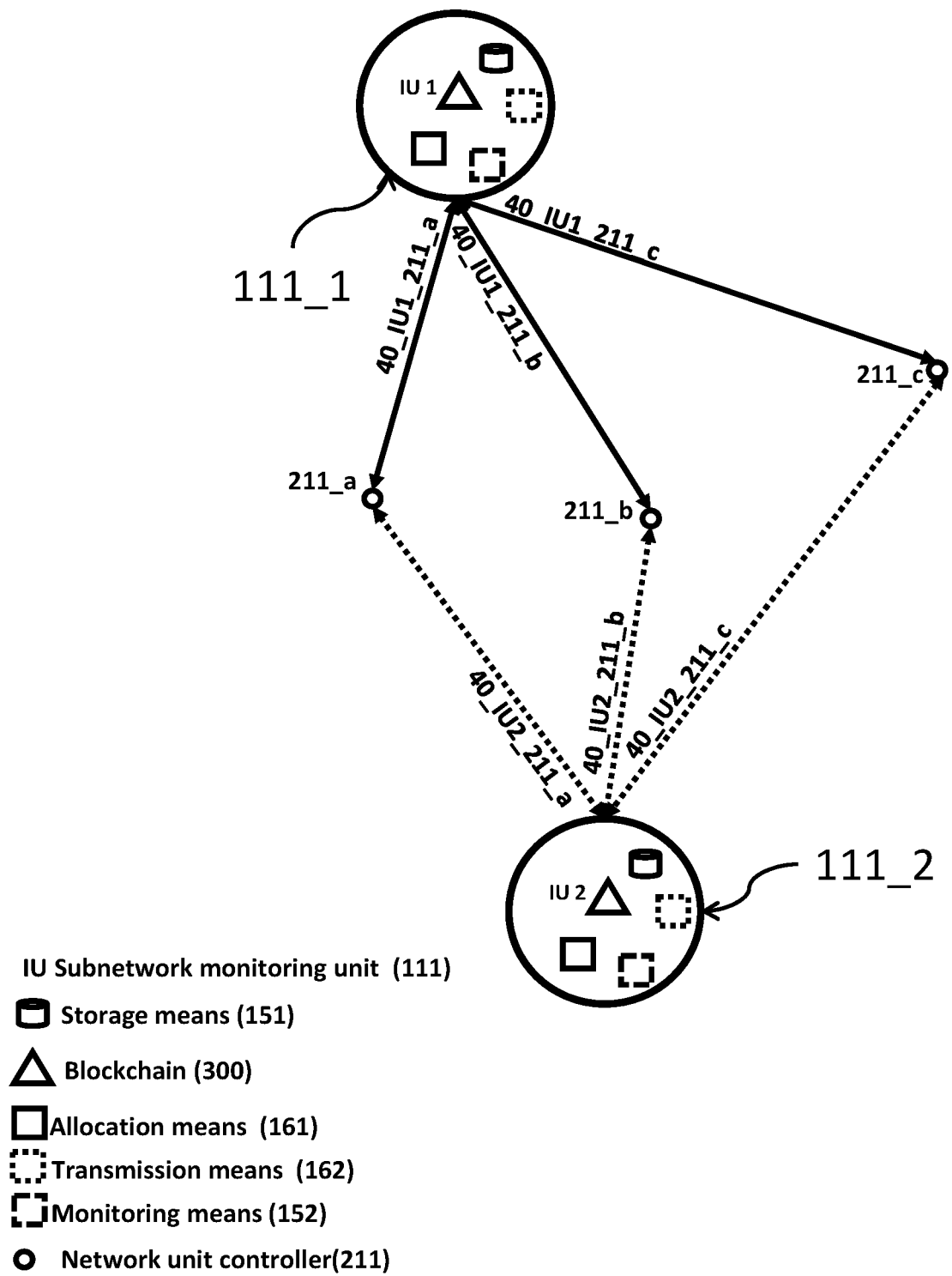
FIG. 6 shows a detail of a schematic diagram of a proposed network which is being operated by means of a method according to an illustrative design of the invention.
Figure 7:
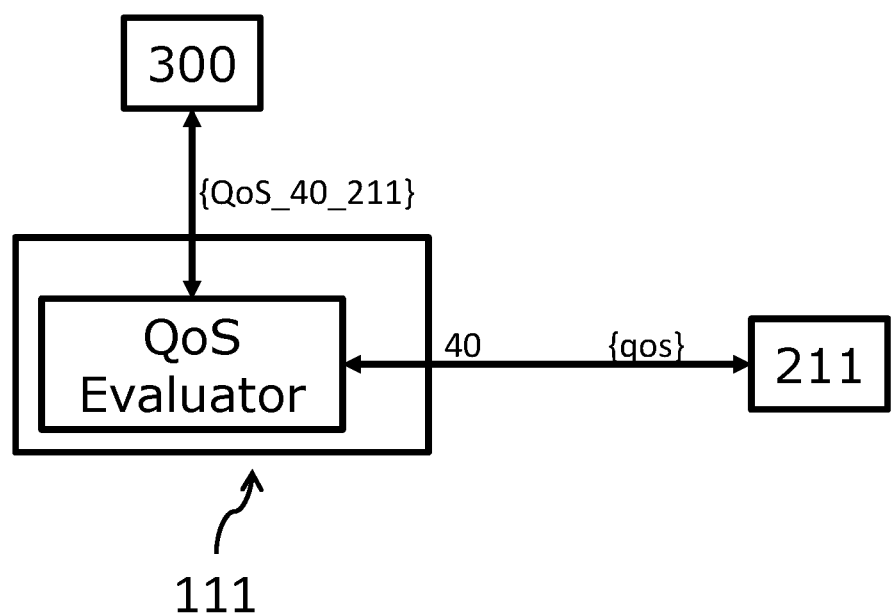
FIG. 7 shows an additional aspect of the invention.

FIGS. 6 and 7 depict additional aspects of the invention.

It is assumed here that a requirement parameter QoS_40_211 applies to a specific communications channel between a specific subnetwork monitoring unit 111 and a network unit controller 211. This parameter can also be stored in the blockchain. The reference sign qos refers to measured parameters that are executed by a QoS determination device, e.g., within a subnetwork monitoring unit 111, to determine a requirement parameter QoS_40_211.

As depicted in FIG. 6, a specific requirement parameter QoS_40_211_$a$, QoS_40_211_$b$, QoS_40_211_$c$ may be required in each case for the communication paths between a subnetwork monitoring unit 111 and one or more network unit controllers 211_$a$, 211_$b$, 211_$c$. This can be understood as being part of the network unit parameter data set 40.

On the hardware side, a specific QoS can be provided for a specific communication path.

Now, on the basis of an actual (measured) property of the respective communication channel, a decision can be made whether a first subnetwork monitoring unit 111_1 or another subnetwork monitoring unit, e.g., subnetwork monitoring unit 111_2, is able to provide the parameters required on the "software side" to the hardware side as well. If this is not possible, a corresponding subnetwork monitoring unit 111 shall not be entrusted with corresponding tasks. The requests may be the same on all paths, or as shown in FIG. 6, they may be different for each individual path. Obviously, mixed configurations may be provided so that, e.g., for certain paths to certain network unit controllers, different requirement parameters apply than for others.

In the same way as for the communication channels, a requirement parameter may (alternatively or additionally) also be intended for a subnetwork monitoring unit 111. This may, for example, allow for the achievement of efficiency, particularly the efficiency of real-time processing. That is to say, in regard to the placement of a task 161, 162, 151, 152 on a subnetwork monitoring unit 111, requirements may in turn be imposed on the efficiency of the subnetwork monitoring unit 111 per se. If this is not currently provided because, for example, the subnetwork monitoring unit 111 has already taken over too many tasks 161, 162, 151, 152, or processing the communication to the network unit controllers 211 takes a great amount of time (or too much time), a corresponding subnetwork monitoring unit 111 shall not be entrusted with the corresponding tasks.

Embodiments of the method according to the invention may therefore further comprise that the blockchain and/or the additional blockchain is also set up to store at least one of the following data sets:

Requirement parameters 40 for each network unit control method regarding a verification whether a subnetwork monitoring unit 111 is suited to execute the corresponding network unit control method.

Network unit control parameters of each network unit controller with respect to the accessibility or responsiveness of the corresponding network unit controller.

The requirement parameters for each network unit control method with respect to a verification whether a subnetwork monitoring unit 111 is suited to execute the corresponding network unit controller method may differ for each subnetwork monitoring unit 111 located in the network or for each network unit control method to be executed in the network. In particular, there may be different quality-of-service (QoS) requirements for the connection between a sensor and an actuator 211, such that the requirement parameters satisfy these various quality-of-service parameters for the relationship of sensor to actuator for each corresponding subnetwork monitoring unit 111.

This design has the advantage that the requirement parameters regarding a verification whether a subnetwork monitoring unit 111 is suited to execute the corresponding network unit control method and/or the network unit control parameters regarding the accessibility or responsiveness of the corresponding subnetwork monitoring unit 111 can be secured against tampering in the same way as the other data to be secured in the corresponding blockchain.

According to another preferred design, the method also comprises that the allocating of each network unit control method to each subnetwork monitoring unit 111 comprises a verification of the corresponding network unit controller as to whether the latter is suited to execute the network unit control method to be allocated. And if the corresponding subnetwork monitoring unit 111 is suited to execute the network unit control method to be allocated, this network unit control method is allocated to the corresponding network unit controller.

This design has the advantage that subnetwork monitoring units 111 only receive allocations of network unit control methods that they can execute. In this way, allocations are avoided that could result in a failure to execute network unit control methods.

Here, quality is meant in the sense of quality-of-service (QoS). It has been found that it may be advantageous for performance reasons if particular subnetwork monitoring units 111 are not suited for a particular algorithm 151, 152, 161, 162 due to lack of bandwidth and/or security of the transmission path, or that a certain subnetwork monitoring unit 111 is not suited, e.g., to provide computing capacity for real-time processing. That is to say, during the (re)distribution/postponement of a function it can be verified whether a device is even physically capable of meeting a software requirement. If so, the functionality can be provided; if not, a different solution must be found. For example, a redistribution of algorithms 151, 152, 161, 162 can then be undertaken on various subnetwork monitoring units 111. A different priority can then be allocated to the algorithms 151, 152, 161, 162 so that key functions receive a higher priority and can be accordingly distributed in a preferable manner before other functions having a lower priority are distributed. In this case, it may also be provided that algorithms 151, 152, 161, 162 having a low priority are not distributed due to a lack of resources.

Like the requirement for real-time processing, the QoS software requirement can be stored in the blockchain. Likewise, physical parameters such as an address (MAC/IP) can be stored by subnetwork monitoring units 111 as well as by network unit controllers 211 in the blockchain 300.

The invention can also be described using an illustration with an electric power network 100 as follows:

The entire power network 100 can be operated entirely by monitoring and controlling the segments 110. Each segment 110 consists of various sensors and actuators, the network unit controllers 211. The subnetwork monitoring units 111 are set up for monitoring and controlling each segment 110 of the power network 100. Each subnetwork monitoring unit 111 receives real-time data from corresponding network unit controllers 211 and uses the allocation means 161, transmission means 162 and monitoring means 152 for monitoring, controlling and protecting the segments 110. The real-time data received by the subnetwork monitoring units 111 is stored in a blockchain 300. The subnetwork monitoring units 111 can communicate with each other. Preferably, all subnetwork monitoring units 111 can communicate with each other. They form an intermeshed network of subnetwork monitoring units 111. The subnetwork monitoring units 111 are executed in hardware in which the allocation means 161, transmission means 162 and monitoring means 152 are hosted, wherein they use the computing resources of the respective subnetwork monitoring units 111. The load allocation thereby corresponds in principle to the allocation of allocation means 161, transmission means 162, monitoring means 152 and storing means 151 to various subnetwork monitoring units 111. Each subnetwork monitoring unit 111 can also host the blockchain 300. Preferably, each subnetwork monitoring unit 111 hosts the (same) blockchain 300. The subnetwork monitoring units 111 can communicate with each other and store their available computing resources, bandwidths and the like in the blockchain 300. This can occur along with all other necessary data for the optimal allocation of allocation means 161, transmission means 162, monitoring means 152 and storing means 151. The resource allocation can take place within the network of the subnetwork monitoring units 111. The smart contract-based resource allocation can take place for allocation means 161, transmission means 162, monitoring means 152 and storage means 151 from a subnetwork monitoring unit 111 to a subnetwork monitoring unit 111.

There can thus be two types of network unit controllers 211: On the one hand, network unit controllers 211 that only send data and on the other, network unit controllers 211 that are able to also receive control commands. A subnetwork monitoring unit 111 can interact with each type of network unit controller 211 or only with network unit controllers 211 that are able to also receive control commands. These network unit controllers 211 can be present in a corresponding part of the network/segment 110, so that the entire part of the network 110 and not only one network unit 101 becomes controllable.

LIST OF REFERENCE SIGNS

- 10 Storing of network unit control methods, network unit parameter data sets and subnetwork monitoring methods
- 11 Network unit control method
- 12 Network unit parameter data set
- 13 Subnetwork monitoring method
- 20 Allocating a subnetwork monitoring unit to a part of the network
- 30 Transmitting a network unit control method to each network unit controller of the part of the network
- 40 Transmitting a network unit parameter data set to each network unit controller of the part of the network
- 50 Monitoring the proper functioning of each network unit controller of the part of the network by the subnetwork monitoring unit
- 60 Loading network information
- 62 Loading network information for each part of the network
- 64 Stored retention of the loaded network information for each part of the network in the corresponding subnetwork monitoring unit
- 70 Randomized, periodic and/or triggered allocation of a network unit control method to a network unit controller
- 80 Randomized, periodic and/or triggered allocation of a network unit parameter data set to a network unit controller
- 90 Distributed allocation of a network unit controller of the network to a part of the network of a subnetwork monitoring unit
- 100 Network
- 101 Network unit
- 110 Part of the network
- 111 Subnetwork monitoring unit, innovation unit
- 130 Transmission and/or reception means
- 150 Monitoring device
- 151 Storage means, database
- 152 Monitoring means
- 160 Load allocation and monitoring system
- 161 Allocation means, monitoring algorithm
- 162 Transmission means, control algorithm
- 163 Additional transmission means
- 211 Network unit controller, sensor/actuator
- 300 Blockchain
- 310 Additional blockchain

What is claimed is:

1. A method for load allocation and monitoring for a resource to be allocated by nodes of a network, wherein the resource to be allocated is a critical resource in terms of supply security of a population group and/or a system, and wherein the nodes of the network comprise network units and each network unit has a network unit controller, the method comprising:

storing network unit control methods, network unit parameter data sets, and subnetwork monitoring methods in at least one blockchain, wherein the at least one blockchain is set up to store static and/or dynamic data;

allocating a subnetwork monitoring unit to a subset of the nodes of the network;

transmitting a network unit control method to each network unit controller of the subset of the nodes of the network;

transmitting a network unit parameter data set to each network unit controller of the subset of the nodes of the network;

wherein the transmitting of the network unit control method and the network unit parameter data sets is cryptographically secured against reading and tampering, and wherein transmitting the network unit control methods and the network unit parameter data sets to the corresponding network unit controllers ensures proper functioning of each network unit controller of the subset of the nodes of the network; and monitoring the proper functioning of each network unit controller of the subset of the nodes of the network by the subnetwork monitoring unit using a corresponding subnetwork monitoring method, wherein the at least one blockchain stores quality of service (QoS) parameters that define a required QoS for operating and monitoring each network unit controller, and wherein, in the event of a failure of the subnetwork monitoring unit, the method comprises:
allocating a respective network unit controllers being monitored by the failed subnetwork monitoring unit to one or more remaining subnetwork monitoring units that are not affected by the failure and that satisfy the QoS parameters for the respective network unit controller, wherein the at least one blockchain stores network unit control parameters of each network unit controller, regarding the accessibility or responsiveness of the corresponding network unit controller, wherein the QoS parameters are different for each network unit controller, and wherein the QoS parameters comprise a bandwidth requirement for the subnetwork monitoring unit, a security requirement for a communication channel between the subnetwork monitoring unit and the respective network unit controller, and a computing capacity requirement for the subnetwork monitoring unit.

2. The method according to claim 1, further comprising:
allocating an additional subnetwork monitoring unit to an additional subset of the nodes of the network;

transmitting a network unit control method to each network unit controller of the additional subset of the nodes of the network;

transmitting a network unit parameter data set to each network unit controller of the additional subset of the nodes of the network; and monitoring the proper functioning of each network unit controller of the additional subset of the nodes of the network by the additional subnetwork monitoring unit using a corresponding subnetwork monitoring method.

3. The method according to claim 1, further comprising:
loading of network information, wherein the network information is indicative of the proper functioning of each network unit controller to be monitored.

4. The method according to claim 3, wherein
the loading of network information comprises:
loading network information for each part of the network; and
storing the loaded network information for each part of the network in the corresponding subnetwork monitoring unit.

5. The method according to claim 3, wherein the loading and/or storing of the network information is cryptographically secured against reading and tampering.

6. The method according to claim 1, wherein the transmitting of a network unit control method to each network unit controller of the subset of the nodes of the network, and the transmitting of a network unit parameter data set to each network unit controller of the subset of the nodes of the network, and/or the loading of network information for each part of the network, and the storing of the loaded network information for each part of the network occur in the corresponding subnetwork monitoring unit, is based on a smart contracting method.

7. The method according to claim 1, further comprising:
setting up an additional blockchain, wherein the blockchain is set up to store static data, and the additional blockchain is set up to store dynamic data.

8. The method according to claim 1, further comprising:
randomized, periodic and/or triggered allocating of each network unit control method to each network unit controller; and
randomized, periodic and/or triggered allocating of each network unit parameter data set to each network unit controller.

9. The method according to claim 8, wherein the randomized, periodic and/or triggered allocating of each network unit control method to each network unit controller takes into account an ability to execute the network unit control method to be allocated, and occurs for the corresponding network unit controller in the network unit controller to be allocated.

10. The method according to claim 8, wherein the randomized, periodic and/or triggered allocating of each network unit control method to each network unit controller and the randomized, periodic and/or triggered allocating of each network unit parameter data set to each network unit controller each occur within the subset of the nodes of the network.

11. The method according to claim 1, wherein the storing of network unit control methods, network unit parameter data sets, and subnetwork monitoring methods in the at least one blockchain occurs based on a time-stamp process.

12. The method according to claim 1, wherein the resource to be allocated is an electrical energy to be distributed, a liquid to be distributed or a gas to be distributed.

13. The method according to claim 1, further comprising:
distributed allocating of each network unit controller of the network to each part of the network of each subnetwork monitoring unit.

14. The method according to claim 1, wherein transmitting a network unit control method to each network unit controller of each part of the network, and/or transmitting a network unit parameter data set to each network unit controller of each part of the network, and/or loading network information for each part of the network, and/or the storing of the loaded network information for each part of the network in the corresponding subnetwork monitoring unit occurs in real time.

15. The method according to claim 1, wherein
the allocating of each network unit control method comprises verifying whether the corresponding network unit controller is suited to execute the network unit control method to be allocated based on at least the QoS parameters for the corresponding network control unit, and
if the corresponding network unit controller is suited to execute the network unit control method to be allocated, allocating this network unit control method to the corresponding network unit controller.

16. A system comprising:
a network unit control device for controlling a network unit within a network, wherein the network is for a resource to be allocated, wherein the resource to be allocated is a critical resource in terms of supply security of a population group and/or a system, and wherein the critical resource comprises electrical energy, the network unit control device comprising:
a transceiver for transceiving a network unit control method and/or a network unit parameter data set of the network unit control device from and/or to a network monitoring unit or a subnetwork monitoring unit that monitors proper operation of the network unit control device, wherein the network unit control method comprises an allocation routine for allocating the resource to consumers connected to the network control device, and wherein the network unit parameter data set comprises data that is used for controlling the network unit control device or the network unit,
wherein the transmitting of the network unit control method and/or the network unit parameter data set is cryptographically secured against reading and tampering, wherein the network unit control device ensures, based on the network unit control method and/or the network unit parameter data set, proper operation of the corresponding network unit,
wherein, in the event of a failure of the network monitoring unit or the subnetwork monitoring unit, the system allocates the network unit control device to one or more other network monitoring units or subnetwork monitoring units that are not affected by the failure and that satisfy QoS parameters for the network unit control device,
wherein the QoS parameters define a required QoS for operating and monitoring the network unit control device,
wherein the QoS parameters are different for each network unit controller, and
wherein the QoS parameters comprise a bandwidth requirement for the subnetwork monitoring unit, a security requirement for a communication channel between the subnetwork monitoring unit and the respective network unit controller, and a computing capacity requirement for the subnetwork monitoring unit.

17. A system comprising:
a monitoring device for monitoring network unit control devices of corresponding network units within a network, wherein the network is for a resource to be allocated, wherein the resource to be allocated is a critical resource in terms of supply security of a population group and/or a system, and wherein the critical resource comprises electrical energy, the monitoring device comprising:

memory for storing network unit control methods, network unit parameter data sets, and subnetwork monitoring methods in at least one blockchain, wherein the at least one blockchain is set up to store static and/or dynamic data; and a transceiver for transceiving network unit control methods and/or network unit parameter data sets of the network unit control devices from and/or to the network unit control devices, wherein the network unit control methods comprise allocation routines for allocating the resource to consumers connected to the network control devices, and wherein the network unit parameter data set comprises data that is used for controlling the network unit control devices or the network units, wherein the transmitting of the network unit control methods and/or the network unit parameter data sets is cryptographically secured against reading and tampering, wherein the monitoring device monitors proper operation of the corresponding network units or proper functioning of the corresponding network unit control devices based on the network unit control methods and/or the network unit parameter data sets, wherein, in the event of a failure of the monitoring device, the system allocates a respective network unit control device being monitored by the monitoring device to one or more remaining monitoring devices that are not affected by the failure and that satisfy QoS parameters for the respective network unit control device, wherein the QoS parameters define a required QoS for operating and monitoring the respective network unit control device, wherein the at least one blockchain stores network unit control parameters of each network unit controller, regarding the accessibility or responsiveness of the corresponding network unit controller, wherein the QoS parameters are different for each network unit controller, and wherein the QoS parameters comprise a bandwidth requirement for the subnetwork monitoring unit, a security requirement for a communication channel between the subnetwork monitoring unit and the respective network unit controller, and a computing capacity requirement for the subnetwork monitoring unit.

18. A load allocation and monitoring system for a resource to be allocated in a network, wherein the resource a critical resource in terms of supply security of a population group and/or a system, and wherein the critical resource comprises electrical energy, the load allocation and monitoring system comprising:

nodes of the network, wherein the nodes of the network include network units and each network unit has a network unit controller;

memory for storing network unit control methods, network unit parameter data sets, and subnetwork monitoring methods in at least one blockchain, wherein the at least one blockchain is set up to store static and/or dynamic data, wherein the load allocation and monitoring system:

allocates a subnetwork monitoring unit to a subset of the nodes of the network, transmits a network unit control method to each network unit controller of the subset of the nodes of the network, transmits a network unit parameter data set to each network unit controller of the subset of the nodes of the network, wherein the transmitting of the network unit control methods and the network unit parameter data sets is cryptographically secured against reading and tampering, and wherein the transmitting of the network unit control method and the network unit parameter data sets to the corresponding network unit controllers ensures proper functioning of each network unit controller of the subset of the nodes of the network; and a monitoring device for monitoring the proper function of each network unit controller of the subset of the nodes of the network using a corresponding subnetwork monitoring method, wherein the at least one blockchain stores quality of service (QoS) parameters that define a required QoS for operating and monitoring each network unit controller, and wherein, in the event of a failure of the monitoring device, the system allocates a respective network unit controllers being monitored by the monitoring device to one or more remaining monitoring devices that are not affected by the failure and that satisfy the QoS parameters for the respective network unit controller, wherein the at least one blockchain stores network unit control parameters of each network unit controller, regarding the accessibility or responsiveness of the corresponding network unit controller, wherein the QoS parameters are different for each network unit controller, and wherein the QoS parameters comprise a bandwidth requirement for the subnetwork monitoring unit, a security requirement for a communication channel between the subnetwork monitoring unit and the respective network unit controller, and a computing capacity requirement for the subnetwork monitoring unit.

* * * * *